US 12,546,685 B2

(12) United States Patent
Sontag et al.

(10) Patent No.: US 12,546,685 B2
(45) Date of Patent: Feb. 10, 2026

(54) INTERFACE STRUCTURED FOR DETACHABLY CONNECTING A VEHICLE TEST BODY TO A SLED BASE IN A VEHICLE BODY TESTING ASSEMBLY

(71) Applicant: Toyota Motor Engineering & Manufacturing North America, Inc., Plano, TX (US)

(72) Inventors: Tiffany Marie Sontag, Milan, MI (US); James Jeffrey Sontag, Milan, MI (US); Kyle Allan Lindsay, White Lake, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 381 days.

(21) Appl. No.: 18/310,583

(22) Filed: May 2, 2023

(65) Prior Publication Data

US 2024/0369453 A1    Nov. 7, 2024

(51) Int. Cl.
*G01M 17/007*    (2006.01)

(52) U.S. Cl.
CPC .............. *G01M 17/0078* (2013.01)

(58) Field of Classification Search
CPC ................................. G01M 17/0078
See application file for complete search history.

(56) References Cited

U.S. PATENT DOCUMENTS

| | | |
|---|---|---|
| 5,783,739 A | 7/1998 | Miller |
| 2011/0192241 A1 | 8/2011 | Aiki |
| 2017/0131181 A1* | 5/2017 | Kim .................. G01M 17/0078 |

* cited by examiner

*Primary Examiner* — Timothy P Graves
(74) *Attorney, Agent, or Firm* — Christopher G. Darrow; Darrow Mustafa PC

(57) ABSTRACT

An interface for detachably connecting a vehicle test body to a sled base in a vehicle body assembly includes a sled first bracket connected to the sled base, a sled second bracket connected to the sled base opposite the sled first bracket, a body first bracket connected to the test body and structured to be detachably connectible to the sled first bracket, and a body second bracket connected to the test body and structured to be detachably connectible to the sled second bracket. In some arrangements, the interface also includes a brace connected to the sled base and a bearing member connected to the test body and structured to contact the brace when the test body is detachably connected to the sled base. The interface enables rapid removal of the test body from the sled base and also absorbs forward momentum of the test body during testing.

11 Claims, 6 Drawing Sheets

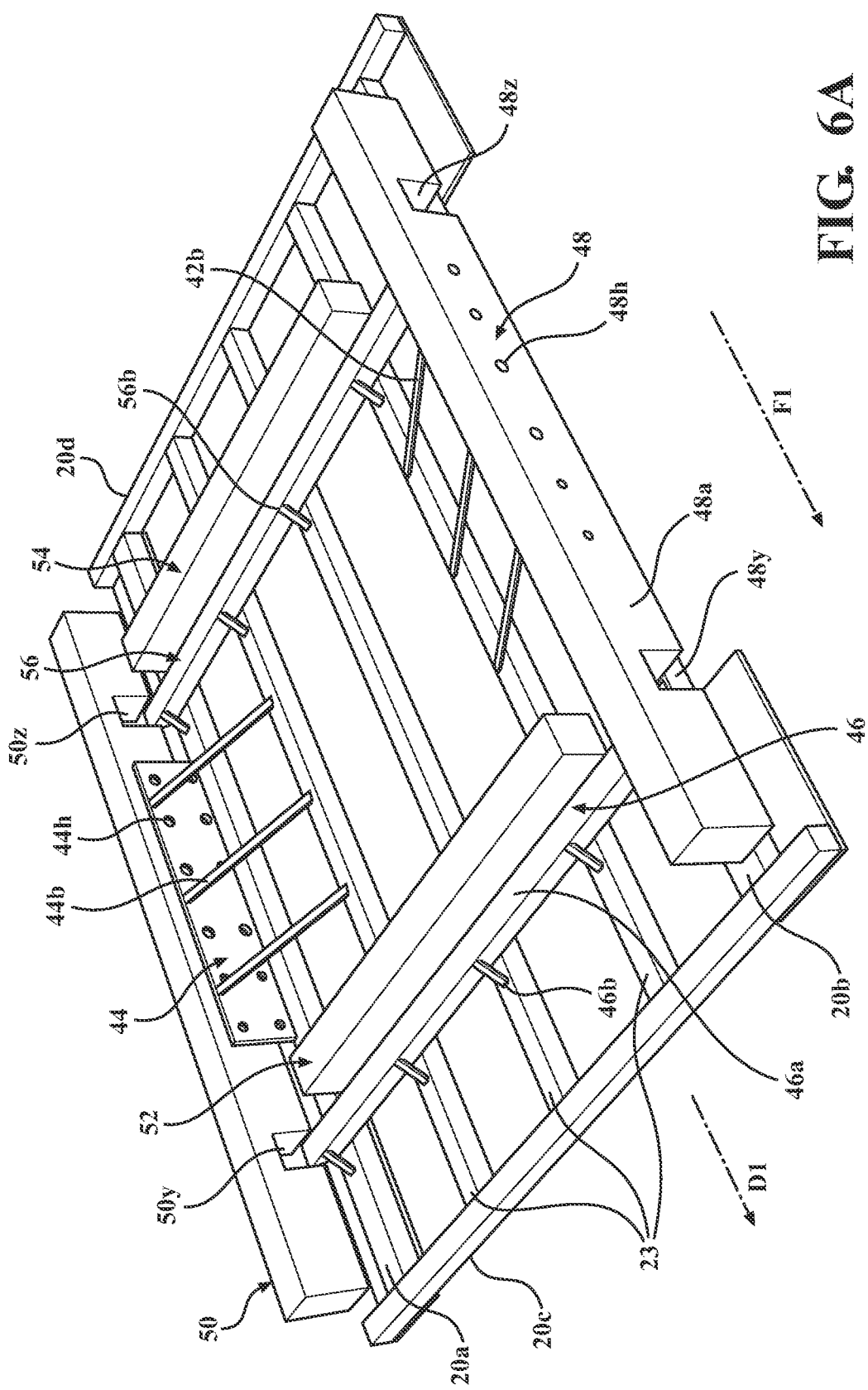

ically. For testing, a vehicle body-in-white (or "whitebody") incorporating the seat belt anchor points may be mounted on a carriage which is movable on rails. To mount the whitebody on the carriage, the whitebody may be welded to a sled base which is then welded to the carriage. Typically, the whitebody frequently needs to be replaced on the sled base due to whitebody deformation incurred during testing. However, using existing methods of attaching the whitebody to the sled base, removal of the damaged whitebody and attachment of a new whitebody is a laborious and time-consuming process.

INTERFACE STRUCTURED FOR DETACHABLY CONNECTING A VEHICLE TEST BODY TO A SLED BASE IN A VEHICLE BODY TESTING ASSEMBLY

TECHNICAL FIELD

The subject matter described herein relates to vehicle testing and, more particularly, to submarine testing of seat-belt connections in a vehicle test body.

BACKGROUND

It is known to use a "crash sled" arrangement for antisubmarine testing of seat anchor and seat belt anchor points mounted in a vehicle body. "Submarining" of a vehicle occupant is a situation where a vehicle occupant slips forward under the seat belt and the waist belt fails to restrain the pelvis of the vehicle occupant. This may occur, for example, when the vehicle occupant sits on the front end of the seat or when the seat back rest is tilted rearwardly, thereby reducing the effectiveness of the seat belt in restraining the occupant or preventing the desired parts of the occupant from being restrained.

For testing, a vehicle body-in-white (or "whitebody") incorporating the seat belt anchor points may be mounted on a carriage which is movable on rails. To mount the whitebody on the carriage, the whitebody may be welded to a sled base which is then welded to the carriage. Typically, the whitebody frequently needs to be replaced on the sled base due to whitebody deformation incurred during testing. However, using existing methods of attaching the whitebody to the sled base, removal of the damaged whitebody and attachment of a new whitebody is a laborious and time-consuming process.

SUMMARY

In one aspect of the embodiments described herein, an interface is provided for detachably connecting a vehicle test body to a sled base in a vehicle body testing assembly. The interface includes a sled first bracket connected to the sled base, and a sled second bracket connected to the sled base opposite the sled first bracket. A body first bracket is connected to the test body and is structured to be detachably connectible to the sled first bracket. A body second bracket is connected to the test body and is structured to be detachably connectible to the sled second bracket.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

It will be appreciated that for simplicity and clarity of illustration, where appropriate, reference numerals may have been repeated among the different figures to indicate corresponding or analogous elements. Also, similar reference numerals appearing in different views may refer to similar elements appearing in those views. In addition, the discussion outlines numerous specific details to provide a thorough understanding of the embodiments described herein. Those of skill in the art, however, will understand that the embodiments described herein may be practiced using various combinations of these elements.

FIG. 6A is a schematic perspective view of the sled base shown in FIG. 4, and showing the positions of the body first bracket, the body second bracket and a pair of bearing members (without the test body shown) relative to the sled first bracket, the sled second bracket, the first brace and the second brace when the test body is detachably connected to the sled base.

DETAILED DESCRIPTION

In embodiments described herein, an interface is provided for detachably connecting a vehicle test body to a sled base in a vehicle body assembly. The interface includes a sled first bracket connected to the sled base, and a sled second bracket connected to the sled base opposite the sled first bracket. The interface also includes a body first bracket connected to the test body and structured to be detachably connectible to the sled first bracket. The interface also includes a body second bracket connected to the test body and structured to be detachably connectible to the sled second bracket. In some arrangements, the interface also includes a brace connected to the sled base and a bearing member connected to the test body and structured to contact the brace when the test body is detachably connected to the sled base. Detachable connection between the sled first and second brackets and body brackets enables rapid and easy removal of the test body from the sled base and also acts to absorb forward momentum of the test body during testing. The brace and the bearing member may also provide additional momentum-absorbing capability.

Figure 1:
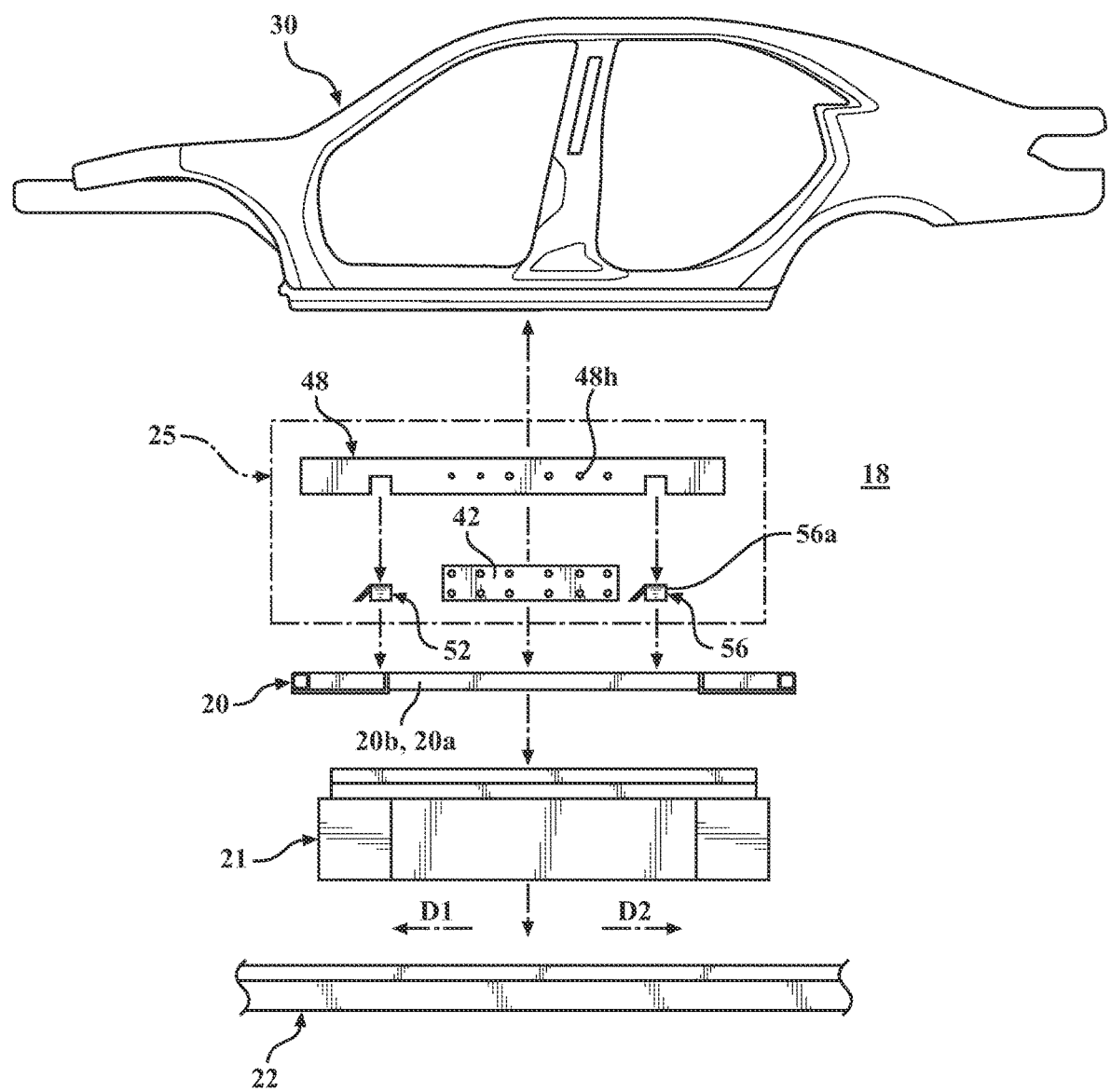
FIG. 1 is a schematic exploded view of a crash sled testing assembly usable for antisubmarine testing of seat anchor and seat belt anchor points mounted in a vehicle test body.

FIG. 1 is a schematic exploded view of a crash sled testing assembly (generally designated 18) usable for antisubmarine testing of seat anchor and seat belt anchor points mounted in a vehicle test body 30. In one or more arrangements, the test body 30 may be a portion of a frame of a prototype vehicle or a simulated frame structure designed for testing one or more aspects of a vehicle design. In particular arrangements, the vehicle test body 30 may be a whitebody (or body-in-white (BIW)) design that may be used to fabricate an actual, production vehicle.

The testing assembly 18 may include a set of opposed, parallel rails 22. The rails 22 may support a carriage 21 onto which the test body 30 is mounted for seatbelt testing. The carriage 21 may be structured to be rollable or slidable along the rails 22 to simulate motion of the test body 30 on a road surface. For example, a test dummy or other mass (not shown) simulating a vehicle occupant may be secured inside the test body 30 using seatbelts. The carriage 21 and an attached test body 30 may the be forced to move along the rails 22 in direction D1 (a forward direction of the test body 30) to simulate a forward motion of a vehicle. A braking force may then be applied to halt forward motion of the test body 30, causing the test dummy to spring forward against the seatbelts.

Figure 4:
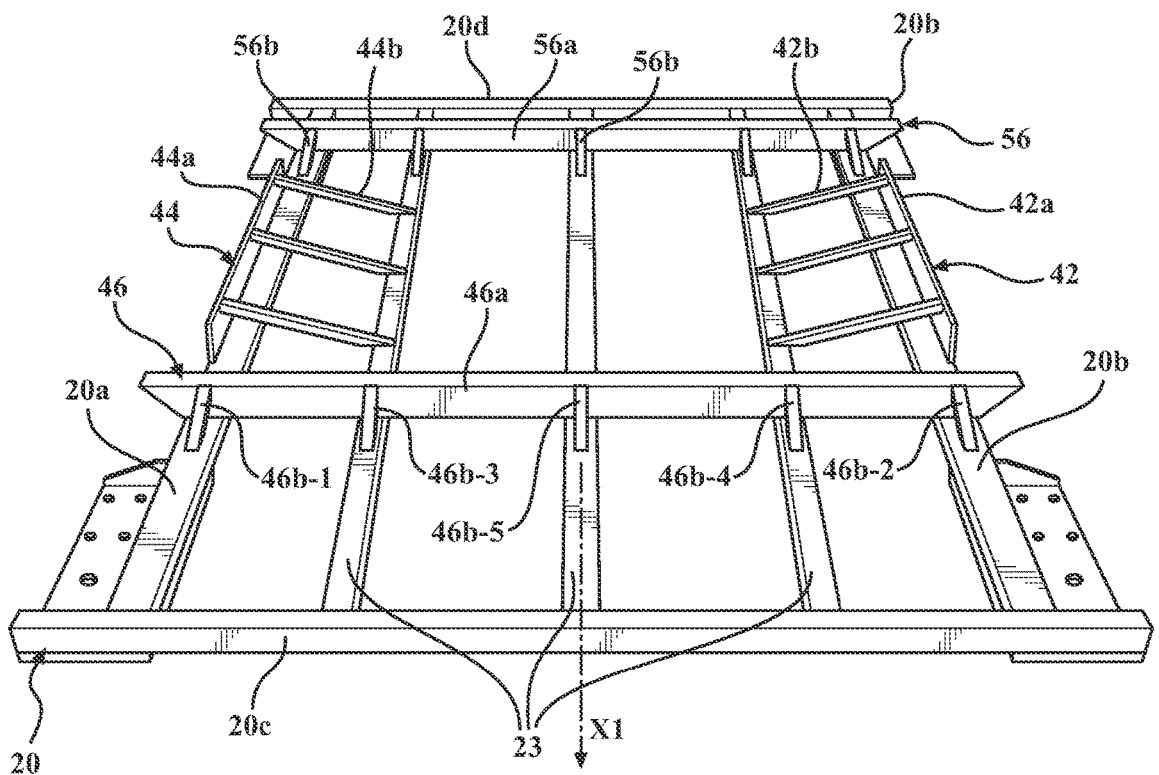
FIG. 4 is a schematic front perspective view of a sled base in accordance with an embodiment described herein, showing connection of a sled first bracket, a sled second bracket, a first brace and a second brace to the sled base.

Referring to FIGS. 1 and 4, the testing assembly 18 may include a sled base 20. In one or more arrangements, the sled base 20 may be generally rectangular and may include a pair of spaced-apart, first frame members 20a, 20b. The first frame members 20a, 20b may extend opposite each other and parallel to each other in longitudinal directions of the sled base. In one or more arrangements, the first frame members 20a, 20b may be elongated longitudinal frame members (i.e., the first frame members may be very long in longitudinal directions of the sled base, in relation to the widths or other dimensions of the first frame members). Longitudinal frame members may be frame members structured to extend parallel to an axis of motion X1 of the sled base 20 during testing. As used herein, "longitudinal" or "longitudinally" refers to an axis or a direction extending parallel to (or along) an intended axis of motion X1 of the sled base 20 during testing, while "lateral" or "laterally" refers to an axis or direction extending perpendicular to a longitudinal axis or direction.

The sled base 20 may also include a pair of second frame members 20c, 20d extending parallel to, and opposite, each other. Each of second frame members 20c, 20d may extend orthogonally with respect to first frame members 20a and 20b. Each of second frame members 20c and 20d may be connected to each of the first frame members 20a and 20b (by welding, for example) as shown in FIG. 4 so as to form a rectangular structure in plan view. In cases where the first frame members 20a, 20b function as longitudinal frame members, the second frame members 20c, 20d may function as lateral frame members (i.e., frame members extending perpendicular to the intended axis of motion X1 of the sled base 20 during testing). In one or more arrangements, the first frame members 20a, 20b and the second frame members 20c, 20d may combine to form an outer frame of the sled base.

Various elements described herein may be connected to each other to form a vehicle body testing assembly. Connections between elements may be direct (i.e., involving actual physical contact between the elements) or indirect (i.e., with one or more additional, intermediate elements interposed between the connected elements, but with the connected elements joined so as to move in concert with each other during crash testing unless the connection fails (e.g., due to shearing of a bolt or failure of a weld)). Unless stated otherwise, an element may be connected to another element using any connection method that enables the connected elements to perform their intended functions. Examples of suitable connection methods including welding, brazing, and insertion of one portion of one element into complementary opening or receptacle formed in another element. Other connection methods may also be used. In specific instances, an element of the testing assembly may be "detachable" from another element or "detachably connected" to another element, for example using bolts, screws, and/or other temporary fasteners designed to rigidly connect the elements for purposes of crash testing, but also to allow a user to separate the connected elements relatively rapidly and easily for replacement and/or repair between test sequences.

A "forward" direction is understood to be a direction in which a forward portion of the vehicle test body faces during crash testing (e.g., direction D1 of FIG. 1). A first element of the testing assembly is positioned "forwardly" of a second element when the first element resides farther in a forward direction than the second element. Similarly, a "rearward" direction is understood to be a direction opposite of the forward direction, or a direction in which a rear portion of the vehicle test body faces during crash testing (e.g., direction D2 of FIG. 1). A first element of the testing assembly is positioned "rearwardly" of a second element when the first element resides farther in a rearward direction than the second element.

Referring again to FIG. 4, the sled base 20 may include one or more longitudinal supports 23 positioned between the opposed first frame members 20a, 20b. Each longitudinal support 23 may have a pair of opposed ends, with each end being welded or otherwise connected to one of the laterally-extending second frame members 20c, 20d. The first frame members 20a, 20b, the second frame members 20c, 20d, and the longitudinal supports 23 may all be arranged and connected to each other as described above using welding, brazing, or another non-detachable or "permanent" connection method so as to form a relatively rigid sled base 20 structured to resist deformation of the sled base and separation of the sled base elements due to stresses experienced during testing using the test body 30. The sled base 20 may be connected to the carriage 21 using welding or any other suitable method or methods, so that the sled base moves along the rails 22 in conjunction with the carriage.

Referring to FIG. 1, the vehicle body testing assembly 18 may include an embodiment of an interface (generally designated 25) structured for detachably connecting the vehicle test body 30 to the sled base 20. The interface 25 may enable secure coupling of the vehicle test body 30 to the sled base 20 so that the sled base can move the test body 30 along the rails 22 during testing. The interface 25 may also enable a user to quickly and easily detach a damaged test body from the sled base 20 and connect a new test body to the sled base 20.

Figure 2A:
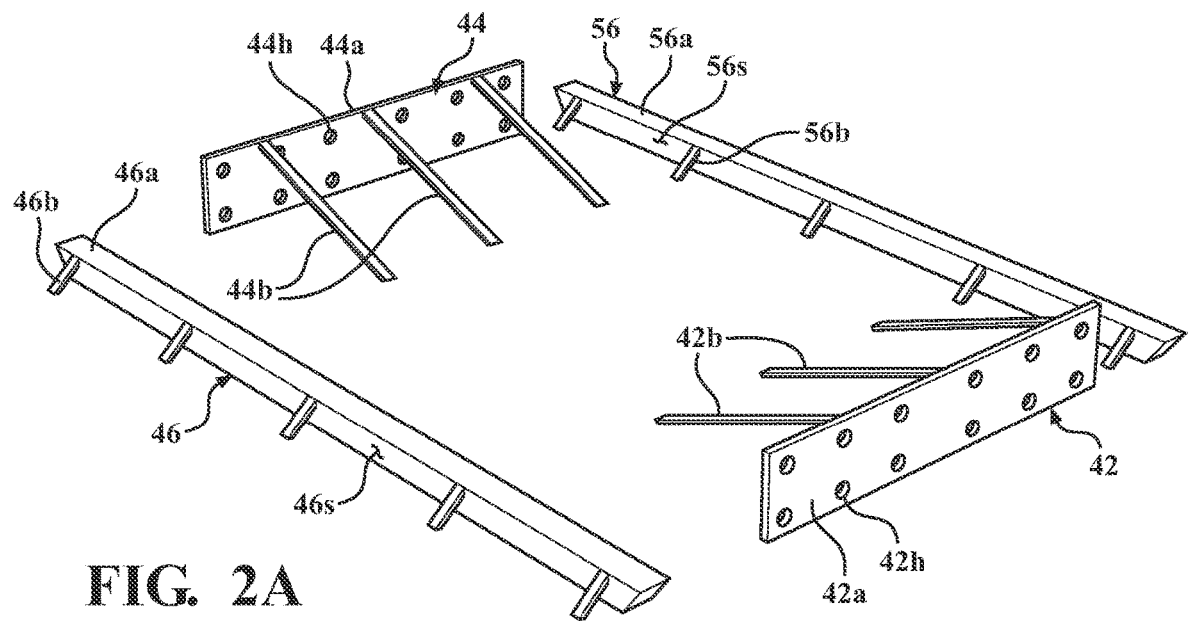
FIG. 2A is a schematic perspective view of a pair of opposed sled brackets and a pair of opposed braces structured to be connectible to a sled base to form portions of a test body-sled base connection interface as described herein.
Figure 2B:
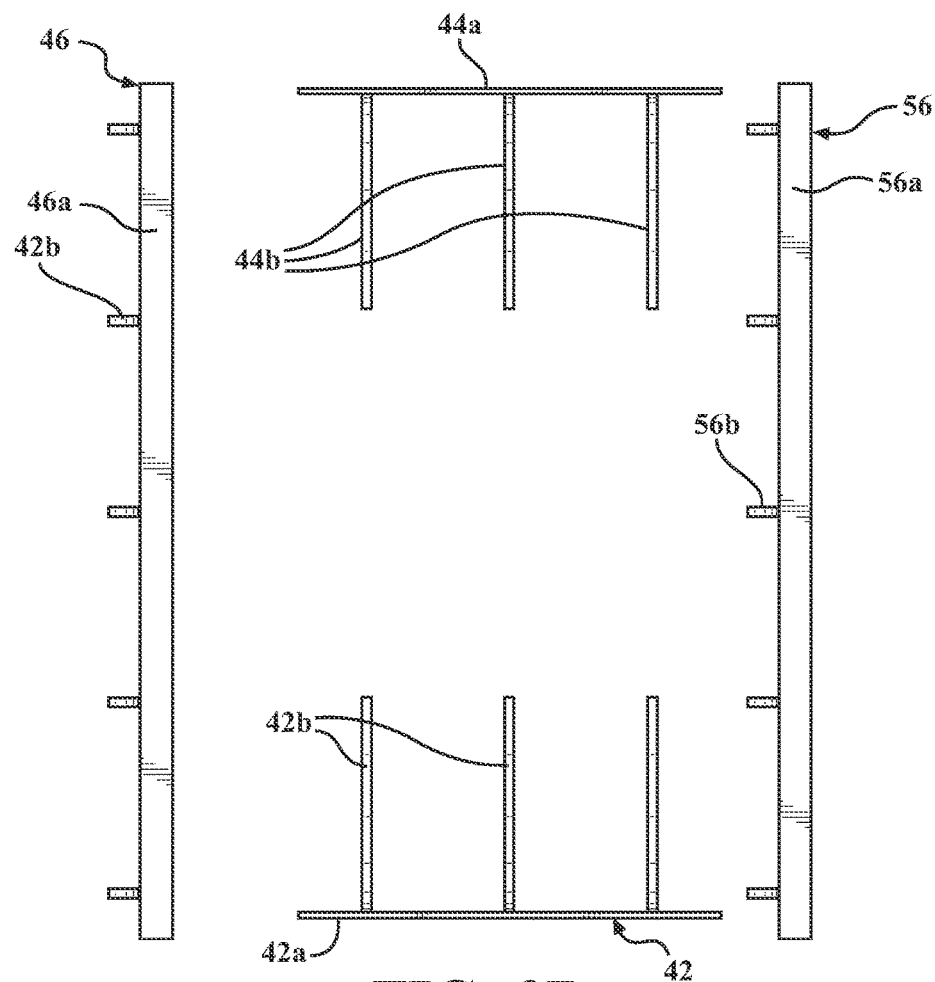
FIG. 2B is a schematic plan view of the arrangement of sled brackets and braces shown in FIG. 2A.

Referring to FIGS. 2A, 2B, and 4, in one or more arrangements, the interface 25 may include a sled first bracket 42 connected to the sled base 20 along first frame member 20b. A sled second bracket 44 may be connected to the sled base 20 opposite the sled first bracket 42, along first frame member 20a. In particular arrangements, the sled first and second brackets 42, 44 may be connected to the sled base 20 by welding, brazing, and/or any other non-detachable connection method (i.e., a relatively "permanent' connection method not designed to enable user detachment of the sled first and second brackets from the sled base 20).

As described herein, the sled first and second brackets 42, 44 may be structured to enable detachable connection of the test body 30 to the sled base 20 when the sled brackets 42, 44 are connected to the sled base 20. In one or more arrangements, each sled bracket may include a base portion structured to be connected to the sled base. For example, referring to sled first bracket 42 in FIGS. 2A, 2B, and 4 for purposes of description, a base portion 42a may be connected to first frame member 20b. The base portion 42a may comprise a flat plate formed from any suitable material (e.g., steel). The base portion 42a may have a plurality of through holes 42h formed therein to enable detachable connection of an associated body bracket 48 (described below) to the sled bracket base portion 42a using bolts, etc.

Each sled bracket may also include at least one support extending from the base portion and structured to be connected to the sled base 20 when the sled bracket base portion is connected to the sled base 20. FIGS. 2A, 2B, and 4 show a plurality of supports 42b extending from the base portion 42a of sled first bracket 42 to the sled base 20. The sled first bracket support(s) 42b may aid in securing the sled first bracket 42 to the sled base 20 and may operate to help transfer lateral loads from the base portion 42a, thereby helping to alleviate stresses acting on the connections between the sled bracket base portion 42a and the sled base 20.

Referring to FIG. 4, a sled first bracket base portion 42a may be connected to one of the first frame members (in this case, first frame member 20b). At least one sled first bracket support 42b may extend from the sled first bracket base portion 42a and may be structured to be connected to a longitudinal support 23 when the base portion 42a is connected to the first frame member 20b. In particular embodiments, and as seen in FIGS. 2A, 2B, and 4, a plurality of sled first bracket supports 42b extends from the sled first bracket base portion 42a and are structured to be connected to a longitudinal support 23 when the sled first bracket 42 is connected to the first frame member 20b.

Similarly, the sled second bracket 44 may be connected to the sled base 20 opposite the sled first bracket 42. The sled second bracket 44 may be structured similarly to the sled first bracket 42. A sled second bracket base portion 44a may be connected to the other first frame member 20a. Also, at least sled second bracket support 44b may extend from the sled second bracket base portion 44a and may be structured to be connected to another sled base longitudinal support 23 when the sled second bracket base portion 44a is connected to the other first frame member 20a. In particular embodiments, and as seen in FIGS. 2A, 2B, and 4, a plurality of sled second bracket supports 44b extends from the sled second bracket base portion 44a and may be structured to be connected to the other longitudinal support 23 when the sled second bracket 44 is connected to the other first frame member 20a.

Referring to FIGS. 1, 3A, 3B, and 5, a body first bracket 48 may be connected to the test body 30. The body first bracket 48 may be structured to be detachably connectible to the sled first bracket 42 when the sled first bracket is connected to the sled base 20. A body second bracket 50 may also be connected to the test body 30. The body second bracket 50 may be structured to be detachably connectible to the sled second bracket 44 when the sled second bracket 44 is connected to the sled base 20.

In particular arrangements, the body first and second brackets 48, 50 may be connected to the test body 30 by welding, brazing, and/or any other non-detachable connection method (i.e., a relatively "permanent' connection method not designed to enable user detachment of the body first and second brackets 42, 44 from the test body 30). The body first bracket 48 may be detachably connected to the sled first bracket base portion 42a using bolts, screws, and/or any other suitable detachable connection method. Similarly, the body second bracket 50 may be detachably connected to the sled second bracket base portion 44a using bolts, screws, and/or any other suitable detachable connection method. Thus, by connecting the body first and second brackets 48, 50 to the test body 30, and by detachably connecting the body first and second brackets 48, 50 to the sled first and second bracket base portions 42a, 44a, respectively, the vehicle test body 30 may be detachably connected to the sled base 20 for testing.

Referring now to FIGS. 2A, 2B, and 4, embodiments of the interface described herein may include a brace 46 connected to the sled base. In one or more particular arrangements, a brace 46 as described herein may be connected to the sled base 20 by welding, brazing, and/or any other non-detachable connection method (i.e., a relatively "permanent' connection method not designed to enable user detachment of the brace 46 from the sled base). Any brace(s) connected to the sled base 20 may be structured and connected to the sled base 20 to help absorb forward momentum of the test body 30 during testing as described herein.

Referring to FIGS. 2A, 2B, 4, and 6A, in one or more arrangements, the brace 46 includes a base portion connected to each of the first frame members. At least a pair of brace supports extends from the brace base portion. Each brace support of the pair of supports may be structured to be connected to an associated one of the first frame members. For example, FIG. 4 shows brace 46 including a base portion 46a connected to each of the first frame members 20a, 20b of the sled base 20. A pair of brace supports 46b-1 and 46b-1 extends forwardly from the base portion 46a. Each of the brace supports 46b-1 and 46b-2 is connected to a respective one of the first frame members 20a, 20b by welding, brazing, etc.

In one or more arrangements, the sled base includes a pair of opposed first frame members and at least one longitudinal support positioned between the first frame members. In addition, the brace includes a base portion connected to at least one of the first frame members and to the at least one longitudinal support. The brace also includes a brace support extending from the base portion and connected to the at least one of the first frame members, and another brace support extending from the base portion and connected to the at least one longitudinal support. For example, FIG. 4 shows a sled base including a pair of opposed first frame members 20a, 20b and at least one longitudinal support 23 positioned between the first frame members 20a, 20b. In addition, the brace 46 includes a base portion 46a connected to at least one of the first frame members 20a, 20b and to the at least one longitudinal support 23. A brace support (either support 46b-1 or 46b-2) extends forwardly from the base portion 46a and is connected to the at least one of the first frame members 20a, 20b to which the base portion 46a is connected, by welding, brazing, etc. In addition, another brace support (any of supports 46b-3, 46b-4, and 46b-5) extends from the brace base portion 46a and is connected to the longitudinal support 23 to which the brace base portion is connected. Additional brace support(s) 46b may also extend from the brace base portion 46a and be connected to associated additional longitudinal support(s) 23 of the sled base 20. In particular arrangements, the brace base portion 46a may be connected (using welding, brazing, etc.) to each of the longitudinal supports, and a separate brace support 46b may extend from the base portion 46a for connection (using welding, brazing, etc.) to each of the longitudinal supports as shown in FIG. 4.

In one or more arrangements, the sled base includes a pair of opposed first frame members and plurality of longitudinal supports positioned between the first frame members. The brace includes a base portion connected to at least two of the sled base longitudinal supports. The brace also includes a plurality of brace supports extending from the brace base portion, with each brace support being structured to be connected to one of the at least two longitudinal supports. For example, FIG. 4 shows a sled base 20 including a plurality of longitudinal supports 23 positioned between the first frame members 20a, 20b. A brace 46 has a brace base portion 46a connected to at least two of the sled base longitudinal supports 23, using welding, brazing, etc. The brace 46 also includes a plurality of brace supports 46b (i.e., supports 46b-3, 46b-4, 46b-5) extending from the brace base portion 46a, with each brace support 46b being connected to an associated one of the at least two longitudinal supports to which the base portion 46a is connected.

Figure 3A:
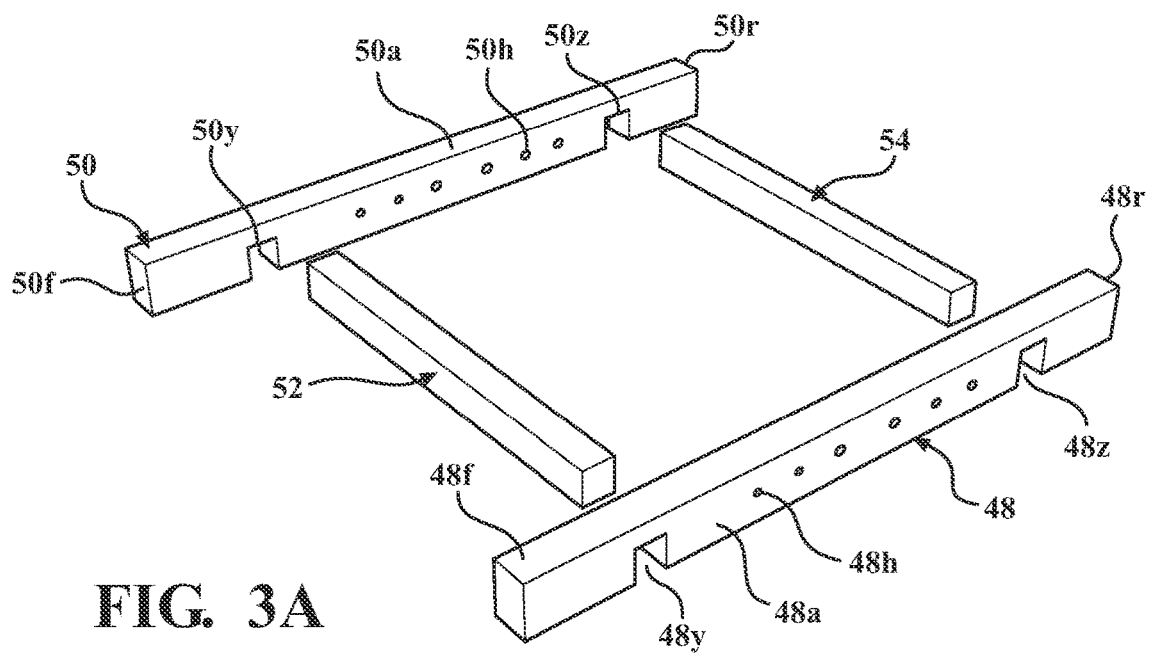
FIG. 3A is a schematic perspective view of a body first bracket, a body second bracket and a pair of bearing members structured for connection to a vehicle test body to form portions of a test body-sled base connection interface as described herein.
Figure 3B:
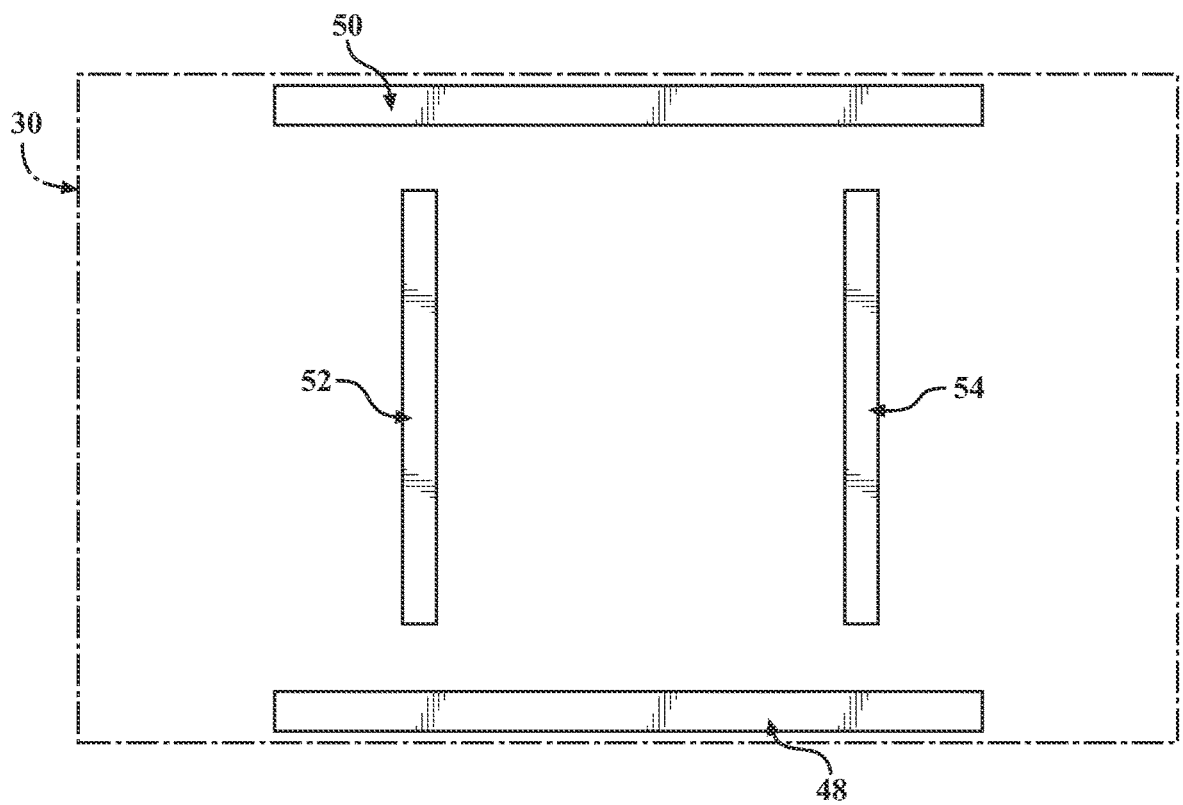
FIG. 3B is a schematic plan view of the arrangement of the body first bracket, the body second bracket and the pair of bearing members shown in FIG. 3A.
Figure 5:
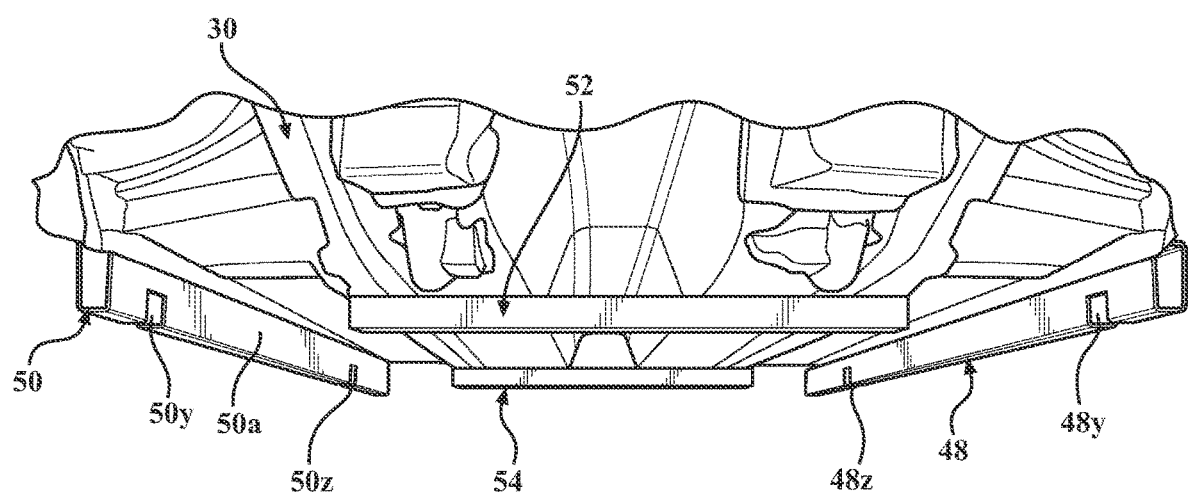
FIG. 5 is a schematic front perspective view of an underside of a test body in accordance with an embodiment described herein, showing connection of the body first bracket, the body second bracket and a pair of bearing members to the vehicle test body.
Figure 6B:
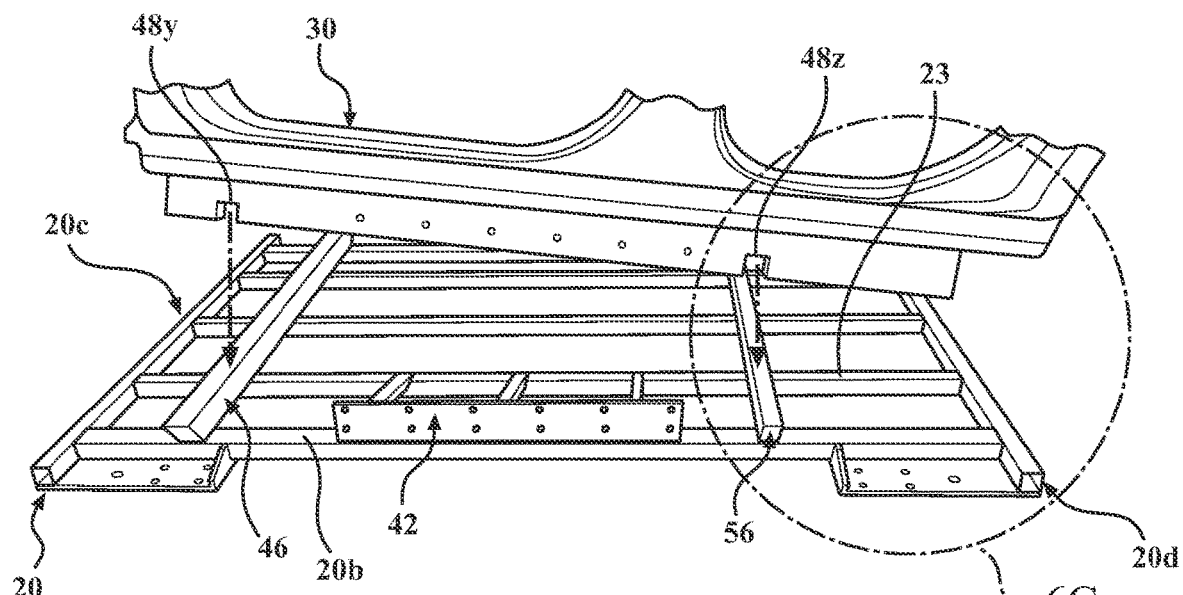
FIG. 6B is a schematic side view of the sled base of FIG. 4 showing slots formed in the body first bracket, and showing the body first bracket being mounted on the braces so as to position a portion of each brace in an associated one of the body first bracket slots.
Figure 6C:
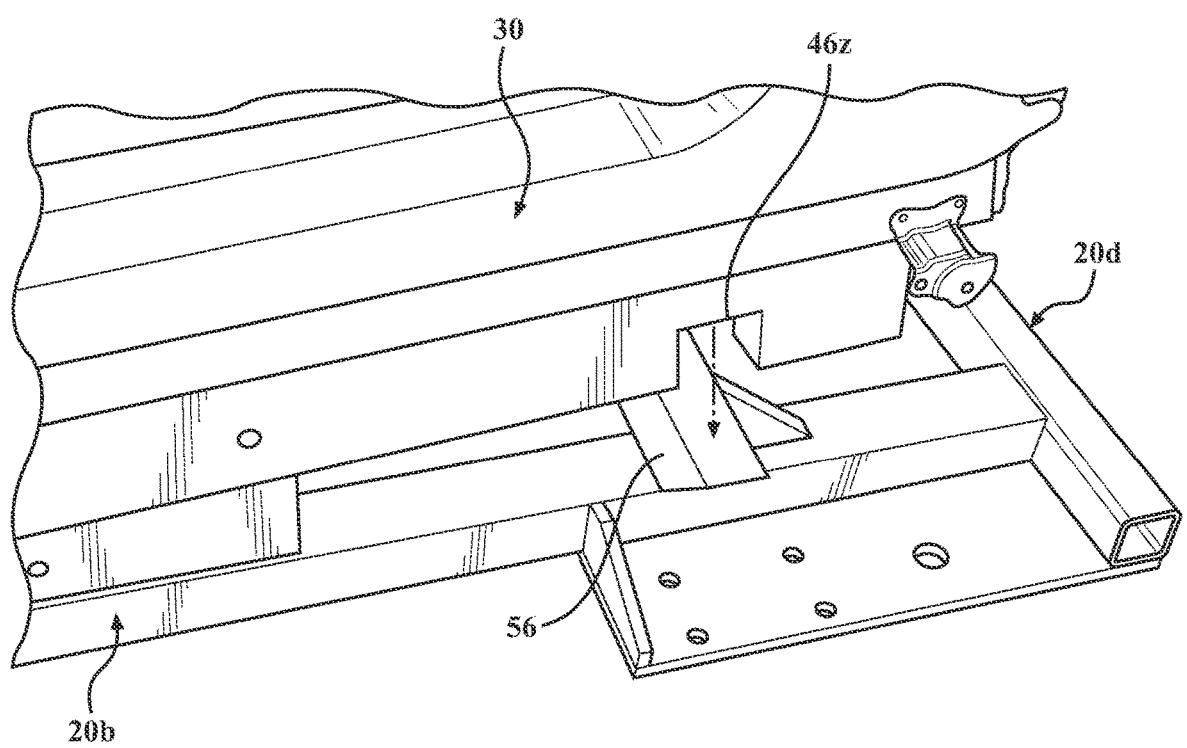
FIG. 6C is a magnified view of a portion of the arrangement shown in FIG. 6B, showing positioning of one of the body first bracket slots over an associated brace, to receive the brace into the slot.

Referring now to FIGS. 3A, 3B, and 5, embodiments of the interface described herein may also include a bearing member 52 connected to the test body 30. In particular arrangements, bearing member 52 may be connected to the test body 30 by welding, brazing, and/or any other non-detachable connection method (i.e., a relatively "permanent" connection method not designed to enable user detachment of the sled first and second brackets from the sled base 20).

The bearing member 52 may be structured to contact an associated brace 46 when the test body 30 is detachably connected to the sled base 20. In addition, as seen in FIG. 6A, at least a portion of the bearing member 52 may be structured to reside rearwardly of the brace 46 when the test body 30 is detachably connected to the sled base 20. Contact between the bearing member 52 and the brace 46 during testing may help absorb the forward momentum of the test body 30 by transferring energy of the moving test body 30 to the sled base 20. This may help reduce stresses on the detachable connections between the sled first bracket 42 and the body first bracket 48, and between the sled second bracket 44 and the body second bracket 50.

Referring to FIGS. 5 and 6A-6C, in one or more arrangements, the body first bracket 48 includes a slot 48y structured to receive therein a portion of the brace 46 when the test body 30 is detachably connected to the sled base 20. During vehicle body testing, the body first bracket 48 may contact the brace 46 along the interior of the slot 48y, thereby absorbing a portion of the forward momentum of the test body 30 during testing. In this manner, the brace-slot engagement provides additional bearing surface area, between the brace 46 and the body first bracket 48, to help absorb the forward momentum of the test body 30 during testing.

As seen in FIGS. 5 and 6A, similarly-structured slots 48y, 50y may be provided in both the body first bracket 48 and the body second bracket 50 so that portions of the slots of both the body first bracket 48 and the body second bracket 50 may contact the brace 46 during testing to help absorb the forward momentum of the test body 30.

Referring to FIGS. 2A-6A, in one or more arrangements, another brace 56 is connected to the sled base 20 rearwardly of (and opposite) the brace 46. In addition, another bearing member 54 is connected to the test body rearwardly of (and opposite) the bearing member 52 and is structured to contact the other brace 56 when the test body 30 is detachably connected to the sled base 20. Provision of another brace on the sled base 20 and an another associated bearing member 54 on the test body 30 may further aid in absorbing the forward momentum of the vehicle test body 30 and reduce stresses on the detachable connections during testing.

Referring to FIGS. 2A, 2B, 4, and 6A, in one or more arrangements, the other brace 56 includes a base portion connected to each of the first frame members. At least a pair of brace supports extends from the brace base portion. Each brace support of the pair of supports may be structured to be connected to an associated one of the first frame members. For example, FIG. 4 shows another brace 56 including a base portion 56a connected to each of the first frame members 20a, 20b of the sled base 20. A pair of brace supports 56b-1 and 56b-1 extends forwardly from the base portion 56a. Each of the brace supports 56b-1 and 56b-2 is connected to a respective one of the first frame members 20a, 20b by welding, brazing, etc.

In one or more arrangements, the sled base includes a pair of opposed first frame members and at least one longitudinal support positioned between the first frame members. In addition, the other brace includes a base portion connected to at least one of the first frame members and to the at least one longitudinal support. The other brace also includes a brace support extending from the base portion and connected to the at least one of the first frame members, and another brace support extending from the base portion and connected to the at least one longitudinal support. For example, FIG. 4 shows a sled base 20 including a pair of opposed first frame members 20a, 20b and at least one longitudinal support 23 positioned between the first frame members 20a, 20b. In addition, the other brace 56 includes a base portion 56a connected to at least one of the first frame members 20a, 20b and to the at least one longitudinal support 23. A brace support (either support 56b-1 or 56b-2) extends forwardly from the base portion 56a and is connected to the at least one of the first frame members 20a, 20b to which the base portion 56a is connected, by welding, brazing, etc. In addition, another brace support (any of supports 56b-3, 56b-4, and 46b-5) extends from the other brace base portion 56a and is connected to the longitudinal support 23 to which the brace base portion is connected. Additional brace support(s) 56b may also extend from the brace base portion 56a and be connected to associated additional longitudinal support(s) 23 of the sled base 20. In particular arrangements, the brace base portion 46a may be connected (using welding, brazing, etc.) to each of the longitudinal supports, and a separate brace support 56b may extend from the base portion 56a for connection (using welding, brazing, etc.) to each of the longitudinal supports as shown in FIG. 4.

In one or more arrangements, the sled base includes a pair of opposed first frame members and plurality of longitudinal supports positioned between the first frame members. The other brace includes a base portion connected to at least two of the sled base longitudinal supports. The other brace also includes a plurality of brace supports extending from the brace base portion, with each brace support being structured to be connected to one of the at least two longitudinal supports. For example, FIG. 4 shows a sled base 20 including a plurality of longitudinal supports 23 positioned between the first frame members 20a, 20b. Another brace 56 has a brace base portion 56a connected to at least two of the sled base longitudinal supports 23, using welding, brazing, etc. The other brace 56 also includes a plurality of brace supports 56b (i.e., supports 56b-3, 56b-4, 56b-5) extending from the brace base portion 56a, with each brace support 56b being connected to an associated one of the at least two longitudinal supports to which the base portion 56a is connected.

Referring now to FIGS. 3A, 3B, and 5, embodiments of the interface described herein may also include another bearing member 54 connected to the test body 30. In particular arrangements, other bearing member 54 may be connected to the test body 30 by welding, brazing, and/or any other non-detachable connection method (i.e., a relatively "permanent' connection method not designed to enable user detachment of the sled first and second brackets from the sled base 20).

The other bearing member 54 may be structured to contact the other brace 56 when the test body 30 is detachably connected to the sled base 20. In addition, as seen in FIG. 6A, at least a portion of the other bearing member 54 may be structured to reside rearwardly of the other brace 56 when the test body 30 is detachably connected to the sled base 20. Contact between the other bearing member 54 and the other brace 56 during testing may help absorb the forward momentum of the test body 30 by transferring energy of the moving test body 30 to the sled base 20. This may help reduce stresses on the detachable connections between the sled first bracket 42 and the body first bracket 48, and between the sled second bracket 44 and the body second bracket 50.

Referring to FIGS. 5 and 6A-6C, in one or more arrangements, the body first bracket 48 includes a slot 48z structured to receive therein a portion of the brace 56 when the test body 30 is detachably connected to the sled base 20. During vehicle body testing, the body first bracket 48 may contact the brace 56 along the interior of the slot 48z, thereby absorbing a portion of the forward momentum of the test body 30 during testing. In this manner, the brace-slot engagement provides additional bearing surface area, between the brace 56 and the body first bracket 48, to help absorb the forward momentum of the test body 30 during testing.

As seen in FIGS. 5 and 6A, similarly-structured slots 48z, 50z may be provided in both the body first bracket 48 and the body second bracket 50 so that portions of the slots of both the body first bracket 48 and the body second bracket 50 may contact the brace 56 during testing to help absorb the forward momentum of the test body 30.

Embodiments of the interface structure described herein may absorb the stresses experienced during body testing while obviating the need to attach the test body to the sled base using a relatively permanent connection method (such as welding). Embodiments of the interface structure also enable the test body to be easily removed from the sled base for repair or replacement, while the test base is used repeatedly for further testing.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. In a vehicle body testing assembly, an interface structured for detachably connecting a vehicle test body to a sled base, the interface comprising:
   a sled first bracket connected to the sled base;
   a sled second bracket connected to the sled base opposite the sled first bracket;
   a body first bracket connected to the test body and structured to be detachably connectible to the sled first bracket;
   a body second bracket connected to the test body and structured to be detachably connectible to the sled second bracket;
   a brace connected to the sled base; and
   a bearing member connected to the test body and structured to contact the brace when the test body is detachably connected to the sled base.

2. The interface of claim 1, wherein the body first bracket includes a slot structured to receive therein a portion of the brace when the test body is detachably connected to the sled base.

3. The interface of claim 1, wherein at least a portion of the bearing member is structured to reside rearwardly of the brace when the test body is detachably connected to the sled base.

4. The interface of claim 1, further comprising another brace connected to the sled base opposite the brace, and another bearing member connected to the test body and structured to contact the other brace when the test body is detachably connected to the sled base.

5. The interface of claim 4, wherein the body first bracket includes a slot structured to receive therein a portion of the other brace when the test body is detachably connected to the sled base.

6. The interface of claim 1, wherein the sled base includes a pair of opposed first frame members, and wherein the brace includes:
   a base portion connected to each of the first frame members; and
   at least a pair of brace supports extending from the brace base portion, each brace support of the pair of brace supports being connected to an associated one of the first frame members.

7. The interface of claim 1, wherein the sled base includes a pair of opposed first frame members and at least one longitudinal support positioned between the first frame members, and wherein the brace includes:

a base portion connected to at least one of the first frame members and to the at least one longitudinal support;

a brace support extending from the base portion and connected to the at least one of the first frame members; and another brace support extending from the base portion and connected to the at least one longitudinal support.

8. The interface of claim 1, wherein the sled base includes a pair of opposed first frame members and a plurality of longitudinal supports positioned between the first frame members, and wherein the brace includes:

a base portion connected to at least two of the longitudinal supports; and a pair of brace supports extending from the base portion, each brace support of the pair of brace supports being connected to an associated one of the at least two of the longitudinal supports.

9. In a vehicle body testing assembly, an interface structured for detachably connecting a vehicle test body to a sled base, the interface comprising:

a sled first bracket connected to the sled base;

a sled second bracket connected to the sled base opposite the sled first bracket;

a body first bracket connected to the test body and structured to be detachably connectible to the sled first bracket; and a body second bracket connected to the test body and structured to be detachably connectible to the sled second bracket, wherein the sled first bracket includes:

a base portion structured to be connected to the sled base; and at least one sled first bracket support extending from the base portion and structured to be connected to the sled base when the base portion is connected to the sled base.

10. In a vehicle body testing assembly, an interface structured for detachably connecting a vehicle test body to a sled base, the interface comprising:

a sled first bracket connected to the sled base;

a sled second bracket connected to the sled base opposite the sled first bracket;

a body first bracket connected to the test body and structured to be detachably connectible to the sled first bracket; and a body second bracket connected to the test body and structured to be detachably connectible to the sled second bracket, wherein the sled base includes a pair of opposed first frame members and a longitudinal support positioned between the first frame members, and wherein the sled first bracket includes:

a base portion connected to one of the first frame members; and at least one sled first bracket support extending from the base portion and structured to be connected to the longitudinal support when the base portion is connected to the one of the first frame members.

11. The interface of claim 10, further comprising a plurality of sled first bracket supports extending from the base portion and structured to be connected to the longitudinal support when the sled first bracket is connected to the one of the first frame members.

* * * * *